United States Patent [19]

De Jong et al.

[11] Patent Number: 4,838,642
[45] Date of Patent: Jun. 13, 1989

[54] FIBRE PLATES HAVING CODING FIBRES

[75] Inventors: Augustinus C. G. De Jong; Antonie Schrederhof, both of Eindhoven, Netherlands

[73] Assignee: U.S. Philips Corp., New York, N.Y.

[21] Appl. No.: 273,732

[22] Filed: Nov. 14, 1988

Related U.S. Application Data

[63] Continuation of Ser. No. 53,769, May 22, 1987, abandoned.

[30] Foreign Application Priority Data

May 23, 1986 [NL] Netherlands ............................ 8601317

[51] Int. Cl.⁴ .................................................. G02B 6/08
[52] U.S. Cl. .................................. 350/96.27; 350/96.25
[58] Field of Search ................ 350/96.24, 96.25, 96.27

[56] References Cited

U.S. PATENT DOCUMENTS

| | | | |
|---|---|---|---|
| 3,247,756 | 4/1966 | Siegmund | 350/96.27 |
| 3,387,959 | 6/1968 | Cole | 350/96.25 X |
| 3,652,855 | 3/1972 | McIntyre et al. | 350/96.27 X |
| 3,693,005 | 9/1972 | Clement | 313/103 |
| 3,797,910 | 3/1974 | Westwig | 350/96.27 |
| 4,185,888 | 1/1980 | Quelle, Jr. | 350/96.25 |
| 4,573,082 | 2/1986 | Teskey | 350/96.27 X |
| 4,640,035 | 2/1987 | Kind et al. | 40/625 |

FOREIGN PATENT DOCUMENTS 1470889  4/1977  United Kingdom .

Primary Examiner—John D. Lee
Assistant Examiner—Phan T. Heartney
Attorney, Agent, or Firm—William L. Botjer

[57] ABSTRACT

A fibre plate comprising a stack of rows of glass fibre bundles and with or without light absorptive fibres in interstices thereof. A number of auxiliary glass fibre bundles are located in predetermined positions in a peripheral area of the face of the plate, having a light transmission characteristic differing from the bundles in the image-forming area of the plate. The positions of the auxiliary bundles with respect to an axis of symmetry of the plate are set in accordance with a code identifying the plate, such as a date or a stack number.

7 Claims, 1 Drawing Sheet

FIBRE PLATES HAVING CODING FIBRES

This is a continuation of application Ser. No. 053,769, filed May 22, 1987, now abandoned.

BACKGROUND OF THE INVENTION

1. Field of the Invention

This invention relates to a fibre plate made up of a stack of rows of glass fibre bundles.

2. Description of the Related Art

Such a fibre plate is disclosed in British Patent Specification No. 1,470,889. It comprises a number of glass fibre bundles which are stacked in mutually orthogonal rows and columns and which each comprise a large number of glass fibres. Such fibre plates are cut from a fibre bundle stack, i.e. a rod composed of drawn and compressed glass fibres having a length of, for example, approximately 25 cm. All fibre plates cut from the same stack generally have the same properties to a great extent and also differences to some extent which may be defects or advantages. It is therefore useful, in particular in the manufacture of fibre plates, to identify in a simple manner from which stack an individual fibre plate has been cut. The cause of differences in individual plates can then often be traced rapidly because in many cases the cause originates from production conditions of the stack in question.

SUMMARY OF THE INVENTION

It is an object of the invention to provide an unambiguous stack coding in fibre plates. For that purpose, a fibre plate of the type mentioned in the opening paragraph is characterized according to the invention in that it comprises fibre bundles which are positioned in the stack in accordance with codes, such bundles having different light transmissions from the other bundles in the stack.

By providing, in the fibre bundle stack and preferably outside the effective image field of the fibre plates to be formed therefrom, a coding of certain fibre bundles distinguishing from the surrounding bundles, it can immediately be seen from which stack the plates cut therefrom originate.

In a preferred embodiment, a difference in transmission is realised by using hybrid bundles comprising fibre bundles with absorbing fibres and fibre bundles without absorbing fibres. In fibre plates composed of bundles having absorbing fibres, fibre bundles without absorbing fibres are provided in coded position outside the effective image field of the plate. For this purpose, for example, a row or block of non-absorbing fibre bundles can be included beyond the image field.

In the production of fibre plates according to the invention, fibre bundles with absorbing fibres and fibre bundles without absorbing fibres are made. Dependent on the desired final product, the absorbing bundles or the non-absorbing bundles can be employed, using the appropriate prior art production process. For example, in the last stacking but one, a type of hybrid fibre bundles are included having, for example, non-absorbing fibre bundles in a corner and the remaining bundles being absorbing fibres, or conversely. The hybrid fibre bundles are located in a predetermined position and orientation relative to the stack, whereby the stack and hence all the fibre plates to be formed therefrom are coded. For example, with four hybrid fibre bundles in a fibre bundle pack of, for example, eight bundles, each of the four hybrid bundles can have four difference angular orientations. As a result, the comparatively large number of approximately 20,000 different codings becomes possible. Codings having no difference in the top view of the stack or underneath view are preferably avoided.

If the coding fibre bundles are placed outside the effective image field of the plate, the invention can be used for channel amplifier plates produced from glass fibre of the plate bundles having closed channels at the plate periphery as described in U.S. Pat. No. 3,693,005. Because the production process described therein for forming stacks is similar to that for forming stacks according to the present invention, the coding may also be employed therein. Inside the image field the core glass is etched away from the fibres, and if absorbing fibres are not used the coding fibre bundles will be composed of non-absorbing fibres.

BRIEF DESCRIPTION OF THE DRAWINGS

The invention will be described in greater detail with reference to the drawings, in which.

DESCRIPTION OF THE PREFERRED EMBODIMENTS

Figure 1:
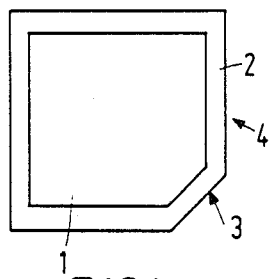
FIG. 1 shows a bevelled monofibre.

FIG. 1 is a cross-sectional view of a fibre which may be used as the starting material for building a fibre plate. The fibre comprises a core 1 and a cladding 2. In practical embodiments both the core and the cladding are of glass but the core may alternatively be of quartz or a synthetic resin, for example, for applications involving radiation differing from a visible wavelength. For fibre-optic plates the core glass differs functionally from the cladding glass by a difference in the refractive index, the refractive index of the core glass being higher than that of the cladding glass. For example, the core glass may have a refractive index of approximately 1.8 and the cladding glass of an index of approximately 1.5. In fibre plates which are to be used as channel amplifier plates but which are produced in quite an analogous manner, the core glass differs from the cladding glass by a better solubility thereof in an etchant. A channel plate is formed from the fibre plates via an etching process. An outer part of the plate is often not subjected to the etching process, so that at that area the fibres remain closed and a coding can be provided according to the invention.

Figure 2:
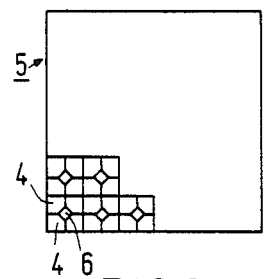
FIG. 2 shows a monofibre bundle having absorbing fibres.
Figure 3:
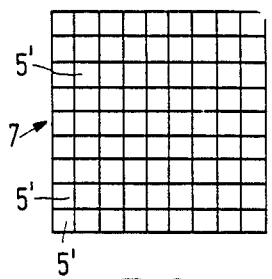
FIG. 3 shows a dual-fibre bundle absorbing fibre bundles.

In the production process for fibre bundles with absorbing fibres, cladding glass is drawn around a core glass rod which is manufactured with comparatively narrow tolerances. A monofibre 4 as shown in FIG. 1 is then formed. The side thereof is approximately, for example, 4 mm and a bevelled part 3 thereof is approximately 1 mm. From the monofibres 4 a monofibre bundle 5 as shown in FIG. 2 is then formed which comprises, for example, 16 times 16 minofibres. Upon stacking the monofibres, each time four bevelled corners adjoin each other so that interstices 6 are formed in which less transparent fibres are placed. A fibre-optic bundle thus formed has a reduced transverse transmission for the light to be transporated, and will hereinafter be termed an absorbing fibre bundle. Such a bundle is known as a fibre-optical with extramural absorption "EMA". The fibre bundle 5 is drawn again to form a fibre bundle 5' having a side of, for example, 1.6 mm. Fibre bundles 5' thus formed are stacked to form a dual-fibre bundle which in this case is square and which comprises, for example 12 times 12 dual fibres 5'. The bundle is then drawn again and absorbing triplex fibres 7 are formed having, for example, a side of 1.7 mm.

Figure 4:
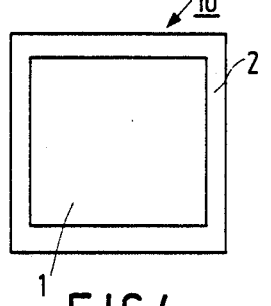
FIG. 4 shows a non-bevelled monofibre.
Figure 5:
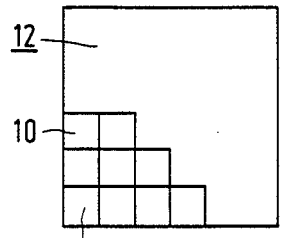
FIG. 5 shows a monofibre bundle without absorbing fibres.
Figure 6:
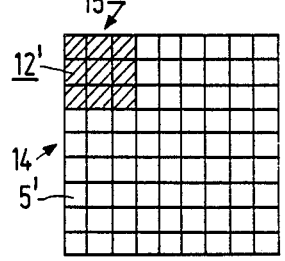
FIG. 6 shows dual-fibre hybrid bundle with both absorbing and non-absorbing fibre bundles.

A monofibre bundle 12 as shown in FIG. 5 can be formed in a corresponding manner from a monofibre 10 as shown in FIG. 4. The monofibre bundle thus formed comprises no absorbing fibres and will therefore be termed a non-absorbing fibre bundle. It is to be noted that the term absorbing and non-absorbing are relative terms and only serve to distinguish between fibre bundles having absorbing fibres, such fibres being placed in the interstices 6 to provide an increased absorption of the light to be used, and fibre bundles in which such absorbing fibres are not incorporated. In the latter kind of fibre bundles a visible difference in transmission is subsequently incorporated in a different manner. Starting from non-absorbing dual fibres 12' and absorbing dual dual-fibre 5' a hybride fibre bundle 14 shown in FIG. 6 is formed having absorbing fibre bundles 5' and also, preferably in a corner portion 15 of approximately 2×2 to 10×10, non-absorbing fibre bundles 12'. This bundle is then drawn again and a hybrid triplex-fibre bundle 14' is formed having a thickness of, for example, 1.7 mm.

Figure 7:
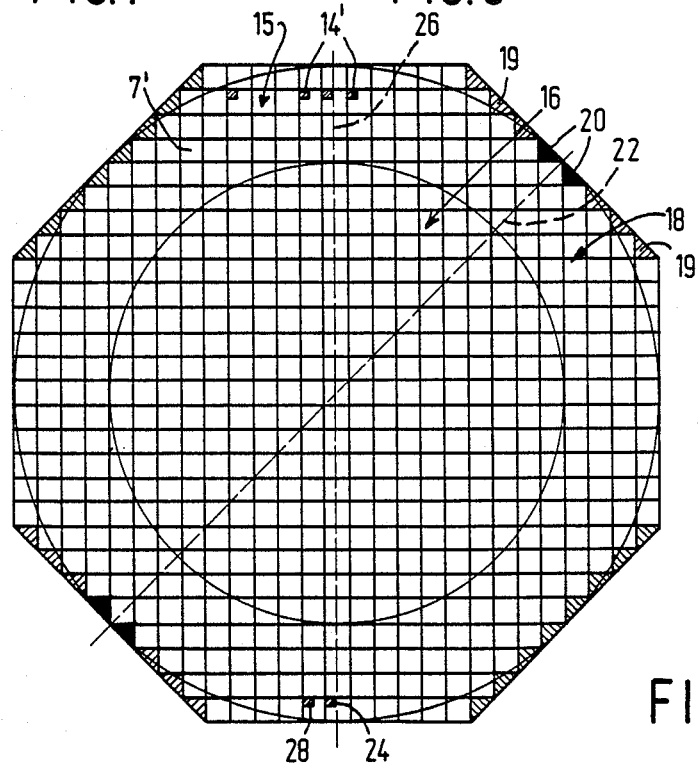
FIG. 7 shows a coded fibre-optic plate.

Using absorbing triplex fibres 7' and hybrid triplex fibres 14', a stack as shown in FIG. 7 is formed. The effective image-forming part 16 thereof consists of the same kind of fibre bundles, as does also a large part of a peripheral area 18. Hybrid triplex fibres 14' are provided in a row or group 15 in the peripheral area in coding positions and coding angular orientations. Such a triplex fibre stack can be formed, for example, by stacking the triplex fibres in an octagonal jig as described in Applicants' published Netherlands Patent Application No. 8503053. As indicated in British Patent Specification No. 1,470,889, the occurrence of interstices 19 in the stack may be used to provide an angularly orienting feature in the fibre plate. For this purpose a characterising fibre 20 may be placed in one or several of the said interstices 19 as a result of which a line 22 is defined which is at an angle of 45° with the orthogonal to the stack structure. For defining the angular orientation, hybrid fibre bundles as described herein may also be used, for example, by incorporating such a hybride fibre bundle in a position 24 which defines a line 26 coinciding with the orthogonal to the stack structure. A possibly better definition of line 26 can be obtained by also arranging a hybrid fibre bundle in the adjacent position 28. These or additional hybrid fibre bundles may also be used to prevent confusion in orientation caused by turning of the plates. A fibre plate may have a completely identical lower and upper sides, but use of these two orientations will provide different non-mirror symmetric codings. This can be seen the arrangement in FIG. 7 using four hybrid bundles 14'. Otherwise, the plates would only have equal angular orientations. A non-mirror symmetrical extra coding to fix the viewing direction for the plate can be provided in a simple manner. For this purpose there may also be used for example, fibre bundles which are built up of non-absorbing fibres and are not located mirror-symmetrically.

By the coding itself, for example, a year or a date and also a stack number for that year may be coded. For either of the two, for example, the date, the position of the selected block of fibre bundles within the peripheral area 18 may be chosen as the coding. For the stack number, the position and angular orientation of the bundles within that block may be chosen as the coding. With a few hybrid fibre bundles, a number can also be coded directly by allotting a numerical value, for example, from 1 to 4, to each of four angular orientations thereof. For a normal production year a number of three or four hybrid bundles is sufficient. By using a coding as described the occurrence of sharp edges and loose particles as a result of cutting or scratching codings on the bundles is entirely avoided.

What is claimed is:

1. An improved fibre plate comprising a stack of rows of bundles of glass fibres, such fibre bundles ending in a face of said plate and having a first kind of light transmission characteristic, the face of said place having an image forming area surrounded by a peripheral area and being symmetrical about an axis of symmetry; such improvement being characterized in that said plate further comprises:

a number of auxiliary bundles of glass fibres ending in the peripheral area of the face of said plate in predetermined positions relative to said axis of symmetry thereof, such positions of the ends of at least some of such auxiliary bundles being in accordance with a code identifying said plate;

such auxiliary bundles having a second kind of light transmission characteristic defining from said first kind of light transmission characteristic.

2. A fibre plate as claimed in claim 1, characterized in that each of said auxiliary bundles is a hybrid comprising fibre bundles having said first kind of light transmission characteristic and fibre bundles having said second kind of light transmission characteristic.

3. A fibre plate as claimed in claim 1 or 2, characterized in that the positions of the ends of at least some of said auxiliary bundles in the face of said plate are at predetermined angular orientations relative to said axis of symmetry of said plate, such angular orientations being in accordance with a further code further identifying said plate.

4. A fibre plate as claimed in claim 1 or 2, characterized in that the positions of the ends of at least some of said auxiliary bundles in the face of said plate relative to said axis of symmetry thereof signify an angular orientation for viewing said plate, such orientation being non-symmetric with respect to such axis.

5. The fibre plate as claimed in claim 1 or 2, characterized in that each of the bundles of fibres in said image-forming area of said plate comprise light transmissive fibres having interstices there-between, and light absorptive fibres situated in such interstices.

6. A fibre plate as claimed in claim 1 or 2, characterized in that each of the bundles of fibres in said image-forming area of said plate comprise glass monofibres having a core glass and a cladding glass, the core glass and cladding glas having different indices of refraction.

7. A fibre plate as claimed in claim 1 or 2, characterized in that each of the bundles of fibres in said image-forming area of said plate comprise light transmissive fibres having an etched-open central channel, and each of the auxiliary bundles of fibres in said peripheral area of said plate comprise light transmissive fibres having a core glass and a cladding glass.

* * * * *